United States Patent Office 3,545,242
Patented Dec. 8, 1970

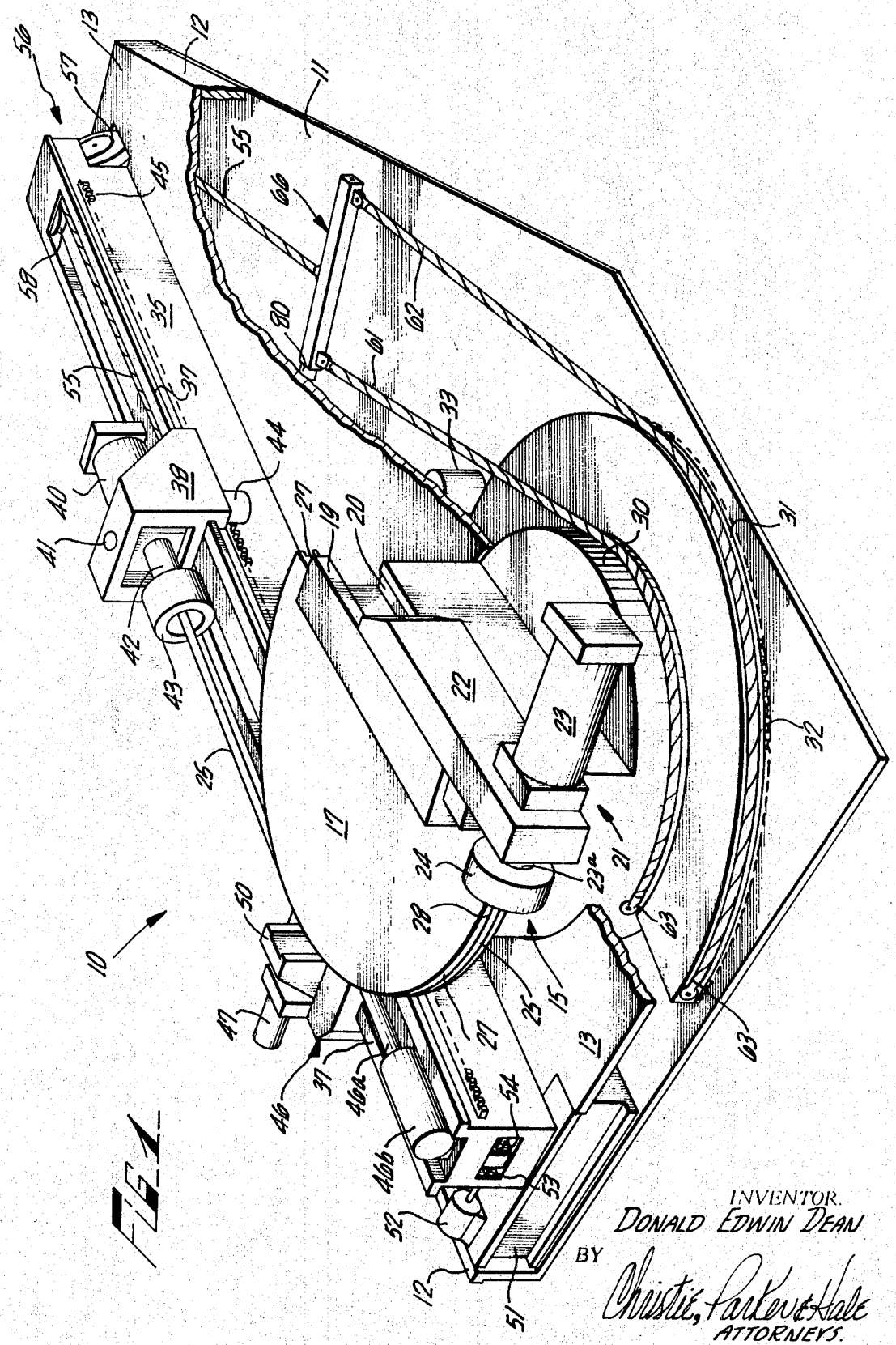

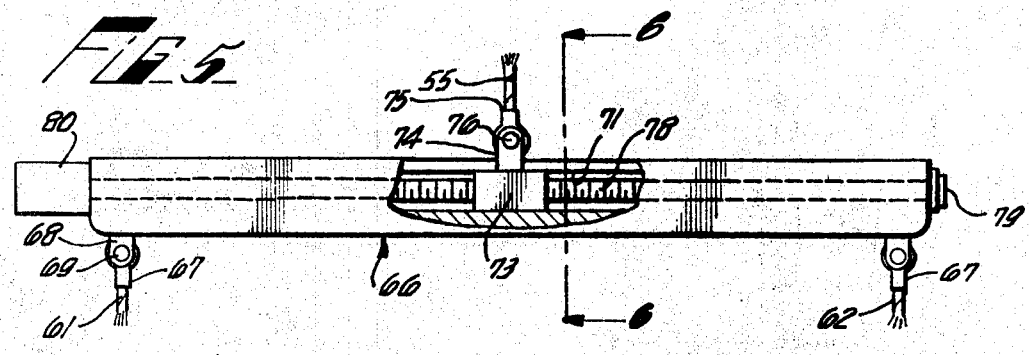

3,545,242
ROTARY STRETCH-FORMING MACHINE
Donald Edwin Dean, San Pedro, Calif., assignor to Sheridan-Gray, Inc., Huntington Park, Calif., a corporation of California
Filed Oct. 14, 1968, Ser. No. 767,279
Int. Cl. B21d 7/04
U.S. Cl. 72—151          10 Claims

ABSTRACT OF THE DISCLOSURE

A balanced-force machine for stretch forming an elongated metal part around a die secured to a table rotatably mounted on a base. The part is gripped at one end by a clamp on the table, and at the other end by a second clamp secured to a tension cylinder which is mounted on the base to be movable toward and away from the table and die. A main cable or other flexible member is secured to the tension cylinder and extends away from the table to pass over a turnaround wheel and then extend back toward the table to be secured to a crossbar. A pair of tension-distributing cables are secured to opposite ends of the crossbar, and then cables are wrapped around winding surfaces of different radii on the table. Torque applied to the table by the tensioned part during stretch forming is counterbalanced by torque applied through the tension-distributing cables such that the energy required to operate the machine is substantially reduced. Dies of different radii are accommodated by adjusting the attachment point of the main cable on the crossbar.

BACKGROUND OF THE INVENTION

Rotary stretch forming machines are well known in the metal-forming field, and typical designs are shown in U.S. Pats. 2,411,801, 2,412,731 and 2,810,421. These machines are useful in forming an elongated workpiece or part such as a metal strip or bar around a die into a desired curvature. A typical application is in the aircraft industry where stretch-forming techniques are used to fabricate fuselage bulkhead members and other large curved parts which must be formed to a precise contour.

An important step in stretch forming is to place the part under high tension as it is wrapped around the die. The tension is controlled to be slightly in excess of the elastic limit of the part in order to avoid loss of shape or "springback" of the part when it is removed from the die. Tensioning is accomplished by clamping one end of the part to the die or to a die-supporting table, and the other end to a hydraulic cylinder or similar powered actuator capable of elongating the part as it is wrapped around the die.

In one form of a prior-art machine, the die is secured on a table which is rotatably mounted on a base. The tensioning hydraulic cylinder is spaced laterally from the table axis of rotation, and is anchored to the base. The part is then clamped to the die or table, and to a piston rod of the tension cylinder. The cylinder is energized to retract the piston rod and threby place the part under an initial tension. A drive motor then is actuated to drive the rotary table whereby the tensioned part is wrapped around the die. A roller or shoe is usually provided to force the part against the die at the point of tangency of the part and die.

Several hundred tons of tension may be applied to the part in a typical stretch-forming operation. The form of machine just described requires a heavy and elaborate structure to carry these very heavy loads because the tension cylinder and table are operating in direct opposition. A large drive motor is needed to drive the table because the heavy torque applied to the table by the tensioned part must be overbalanced before rotation is achieved. Furthermore, an expensive and massive long-stroke tension cylinder is necessary because the piston rod must extend steadily in order to maintain reasonably constant tension as the part is wrapped around or "reeled" on the die.

Some of these problems are alleviated in another form of prior-art machine using an endless drive chain which passes over a sprocket on the rotary table and over a second sprocket laterally spaced from the table axis. The tension cylinder is mounted on the drive chain, and is carried toward the table as the part is wrapped around the die. A powerful drive motor is still required in this machine, however, because a balanced-force condition (in which opposite and substantially equal torques are applied to the table by the tensioned part and drive chain) is presented only when a die of specific size and geometry is used.

Stretch-forming machines represent a significant capital investment, and normally must have the capability of fabricating a variety of different parts on dies of varying contour and radii. To meet this requirement, the known chain-drive machines thus must be equipped with powerful drive motors, long-stroke tension cylinders, and relatively massive frames and other structural components to handle the loads present when a balanced-force condition is not achieved due to the geometry of the die.

The rotary stretch-forming machine of this invention overcomes these shortcomings of known rotary machines, and is useful in a balanced-force condition with dies of a variety of different sizes. Cost of the machine is considerably reduced due to the lighter and simpler structural members needed to carry loads arising from tensioning of the part, and a relatively inexpensive short-stroke hydraulic cylinder is satisfactory for tensioning. A small and inexpensive drive motor is adequate to rotate the die table because only friction loads need to be overcome due to the balanced-force design of the machine.

SUMMARY OF THE INVENTION

Briefly stated, the machine of this invention is useful for stretch forming an elongated part over a curved die. The machine includes a base, and a die-supporting table is rotatably mounted on the base and is adapted to receive and support curved stretch-forming dies of differing radii. A clamp is carried by the table and is adapted to grip one end of the elangated part. Preferably, the clamp is mounted on a hydraulic cylinder secured to the table, the cylinder being useful to apply restretch forces to the part after it is wrapped around the die.

The base includes a beam pivotally secured at one end thereto, the beam being movable toward and away from the axis of rotation to the table. A tensioning means is mounted on the base beam, and is movable along the length of the beam. The tensioning means preferably includes a main tension cylinder secured to a carriage which is in turn slidably mounted on the beat. A gripping clamp is secured to a piston rod of the hydraulic cylinder, the clamp being adapted to grip the end of the part remote from the table. A torque balancing means is coupled between the tensioning means and the table for applying to the table a torque which is opposite and substantially equal to torque applied to the table by the tension part. The torque-balancing means is adjustable whereby a balance of torque forces on the table can be achieved when the machine is used with dies of differing radii of curvature.

In one form of the invention, the torque-balancing means includes a turnaround means mounted on the base and laterally spaced from an axis of rotation of the table, and a coupling means passed around the turnaround means and connected at opposite ends to the tensioning means and the table. In a presently preferred configuration, the coupling means includes a first flexible member passing around the turnaround means and having a first end secured to the tensioning means and a second end extending back toward the table. A pair of second flexible members have first ends secured to the table and second ends extending toward the turnaround means. The table defines a pair of curved winding surfaces on which the second flexible members are wound as the table is rotated, the surfaces having unequal radii of curvature whereby the second members are wrapped at different lineal rates as the table is rotated. A crossbar is disposed between the turnaround means and the table, and has spaced-apart ends to which the second ends of the second flexible members are respectively secured. A connection means is provided for fastening the second end of the first flexible member to the crossbar at a selected position between the spaced-apart ends, whereby tension in the first flexible member is distributed between the second flexible members in an adjustable manner.

BRIEF DESCRIPTION OF THE DRAWINGS

FIG. 1 is a perspective view, partly broken away, of a rotary stretch-forming machine according to the invention;

FIG. 2 is an end view of a tension-cylinder support beam and compression-shoe carriage;

FIG. 3 is a top view of the compression-shoe carriage;

FIG. 4 is a partial view of the tension-cylinder support beam showing a pair of pulleys used to guide and reverse the direction of a main cable;

FIG. 5 is a plan view, partly broken away, of a crossbar assembly;

FIG. 6 is a view on line 6—6 of FIG. 5;

DESCRIPTION OF THE PREFERRED EMBODIMENTS

Figure 7:
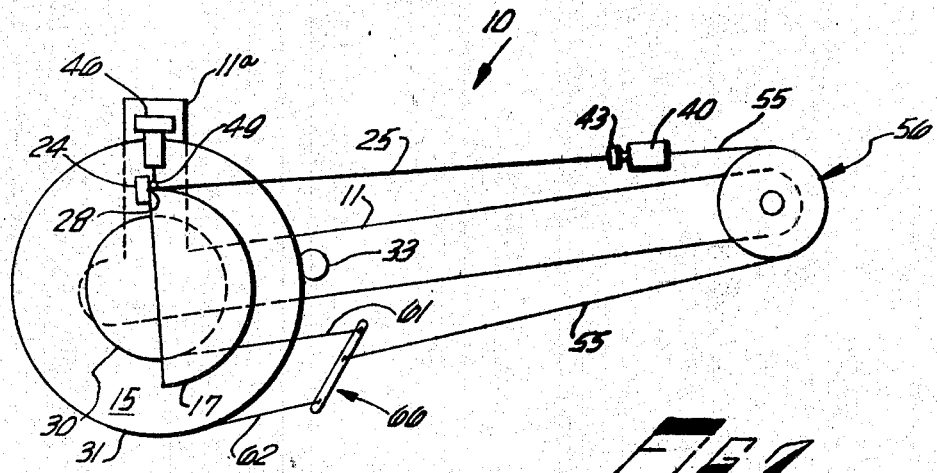
FIG. 7 is a plan view showing the components of the machine in schematic form at the beginning of a stretch-forming operation.

A rotary stretch-forming machine 10 according to the invention is illustrated in FIG. 1. The machine includes a base 11 having upstanding sidewalls 12 and a cover 13 which serves as a floor for an operator. A die-supporting table 15 is rotatably mounted on the base in conventional fashion, and has an upper surface adapted to receive a stretch-forming die 17. The table surface is provided with locking channels or clamps (not shown) of a conventional type to secure dies in a variety of sizes of the table.

A support member 19 extends upwardly from the table, and defines a guide channel 20 in which is slidably mounted a clamp assembly 21. The clamp assembly includes a beam 22 having secured at one end thereof a hydraulic cylinder 23 of a conventional type. A gripping jaw or clamp 24 is secured at the end of a piston rod 23a extending from cylinder 23. Clamp 24 is of a conventional construction, and is used to grip one end of a workpiece or part 25 to be formed around die 17.

Although the stretch-forming machine of this invention is useful with many different kinds of stretch-forming dies, the specific configuration shown in FIG. 1 is intendeded primarily for use with dies having a peripheral wrapping or forming surface 27 which extends about 180° or less. The die shown in the drawing is substantially semicircular, but it is to be understood that dies of other geometries are also useful with the machine.

Clamp assembly 21 is adjustable laterally of the table axis of rotation by sliding beam 22 in guide channel 20 such that clamp 24 is aligned with part 25 immediately adjacent a leading edge 28 of the die. When this adjustment has been made, beam 22 is secured in the guide channel by any conventional locking means (not shown). Cylinder 23 is useful in a re-stretching operation to be described below, and can be omitted if re-stretching is not required. If the cylinder is omitted, clamp 24 is rigidly secured directly to beam 22.

The lower part of the die-supporting table defines two pulleys or curved winding surfaces 30 and 31. These surfaces are cylindrical or semicylindrical, and are coaxial with the axis of rotation of the table. The surfaces have different radii, and these dimensions are determined by the minimum and maximum sizes of dies to be accommodated on the machine. Surface 30 has a radius substantially equal to the radius of curvature of the smallest die to be used on the machine. Surface 31 has a radius substantially equal to the radius of curvature of the largest die to be used on the machine.

The lowermost portion of the periphery of winding surface 31 defines gear teeth 32. A table drive motor 33 is secured to base 11 beneath cover 13 and drives a pinion (not shown) engaged with teeth 32. Motor 33 is used to rotate the die-supporting table during operation of machine 10 as discussed below.

A tension-cylinder support beam 35 rests on base cover 13, and is pivotally secured to the base by a cylindrical post or trunnion 36 (see FIG. 4) having an upright axis which is parallel to and laterally spaced from the axis of rotation of table 15. The upper surface of support beam 35 defines a pair of guide rails 37 on which is slidably mounted a tension-cylinder carriage 38 which is movable along the length of the beam. A main hydraulic tensioning cylinder 40 is pivotally secured to carriage 38 by an upright pin or trunnion 41, and the cylinder has extending therefrom a piston rod 42 with a conventional gripping jaw or clamp 43 mounted at the end thereof. The end of part 25 remote from die 17 is gripped in clamp 43. An auxiliary drive motor 44 is secured to carriage 38 to drive a pinion (not shown) engaged with an elongated rack 45 mounted on the side of beam 35. Motor 44 is used only for initial positioning of relatively massive carriage 38 along beam 35, and is not actuated during actual stretch forming of parts.

A compression-shoe carriage 46 (FIGS. 1–3) is mounted on support beam 35, and is guided by rails 37 to be movable along the support beam adjacent die 17. A hydraulic cylinder 47 is secured to carriage 46, and has a piston rod 48 extending perpendicularly from beam 35 toward die 17. A compression roller or shoe 49 is mounted on a carrier 50 which is secured at the end of the piston rod and slidably supported in a pair of guide channels 50a in carriage 46. The shoe contacts part 25 at its point of tangency with die 17. A hydraulic cylinder 46b is secured to beam 35 between rails 37, and has a piston rod 46a secured to carriage 46. Cylinder 46b is used for initial positioning of the carriage, and also to wipe the compression shoe along any flat portions which may be present on the die. Shoe 49 is adjustable vertically on carrier 50 to insure vertical alignment with the part and die. This system of cylinder and compression-shoe mounting is conventional, and, and brevity, will not be described in detail.

The end of support beam 35 remote from trunnion 36 rests on a base beam 51 having mounted thereon a reversible beam-positioning motor 52 of a conventional electric or hydraulic type. A lead screw 53 is connected to and driven by motor 52, and the lead screw extends through a nut 54 which is pivotally mounted within the end of beam 35. Actuation of the drive motor moves the beam about trunnion 36 toward or away from die 17, and compression-shoe carriage 46 is thus readily positionable adjacent stretch-forming dies of different sizes.

A flexible member such as a first or main cable 55 is rigidly secured to tension-cylinder carriage 38 and extends rearwardly between guide rails 37 toward trunnion 36 to be guided around a turnaround means 56 at the end of the support beam. In the machine shown in the drawings, the turnaround means includes a pair of pulleys 57 and 58 which guide and reverse the direction of cable 55 such that the cable extends back toward the side of table 15 opposite the point of tangency of the part and die. Pulley 57 has an inclined or canted axis of rotation such that the cable is guided downwardly beneath cover 13 and laterally away from the support beam. Pulley 58 has a vertical axis of rotation, and guides the cable as it passes off pulley 57 to avoid any tendency for the cable to slide over the pulley flanges.

A pair of secondary flexible members or tension-distributing cables 61 and 62 are respectively secured by conventional cable-end fittings 63 to winding surfaces 30 and 31 on the die-supporting table. These cables extend away from the winding surfaces on the table toward the turnaround means, and the extending ends of the cables are secured at opposite ends of a whiffletree or crossbar 66. As best seen in FIGS. 5 and 6, the extending ends of the cables carry conventional cable-end fittings 67 which are received in clevis fittings 68 on the crossbar and anchored by bolts 69.

Crossbar 66 defines a guide channel 71 extending along the length thereof, and the channel includes a slot 72 through a sidewall of the crossbar facing the turnaround means. A block 73 makes a sliding fit within channel 71, and includes a clevis fitting 74 which extends through slot 72. Main cable 55 has a cable-end fitting 75 which is secured to the clevis fitting by a bolt 76.

A threaded shaft or lead screw 78 is threaded through block 73, and extends within the length of guide channel 71. One end of the lead screw is rotatably supported by a bearing block 79 fastened at one end of the crossbar, and the other end of the lead screw is coupled to a reversible drive motor 80 (of a conventional electric or hydraulic type) mounted at the opposite end of the crossbar. Actuation of the drive motor rotates lead screw 78 to drive block 73 to any desired position along the length of the crossbar.

The operation of the machine will be described in terms of the simplified schematic diagrams shown in FIGS. 7–9. In these views, machine 10 is shown with a simple elongated beam serving as base 11. Die-supporting table 15 is rotatably mounted adjacent one end of the beam, and turnaround means 56 is rotatably mounted at the opposite end of the beam. The beam has a lateral extension 11a on which is mounted compression-shoe carriage 46. The base beam, compression-shoe carriage and motor 33 are omitted in FIGS. 8 and 9 for clarity.

In operation of the stretch-forming machine, elongated part 25 is locked in clamps 24 and 43 to pass over the leading end of the die as shown in FIG. 7. Tension cylinder 40 is next energized to place the part and cables 55, 61 and 62 under tension. The tensioned part imposes a torque on the die-supporting table, the torque tending to rotate the table in a clockwise direction as seen in FIG. 7. The magnitude of the torque is determined by the tension force in the part multiplied by the moment arm over which it acts or the radius from the center of the table to the point of contact of the die and part.

Assuming that the machine is in static equilibrium after the tension cylinder has been energized, it is clear from the drawings that main cable 55 experiences a tension force equal in magnitude to the tension imposed on the part. If these tensions were unequal, the tension cylinder would move as it is free to slide along guide rails 37 on the tension-cylinder support beam. As the main cable rides freely around the turnaround means, this full tension force is imposed by the main cable on crossbar 66. This tension force is divided between the secondary or tension-distributing cables 61 and 62 which are in turn secured to winding surfaces 30 and 31 on the table. The tension-distributing cables impose on the die-supporting table counterclockwise torques equal to the tension in each cable multiplied by the respective moment arm or radius of the winding surface on which the cable is wrapped.

The function of the crossbar is to adjust the amount of counterclockwise torque imposed on the table by the tension-distributing cables. The need for such an adjustment arises from the use of dies of different sizes on the machine. If a die of large radius is used, the clockwise torque imposed on the table by the tensioned part will exceed the torque arising from the use of a similarly tensioned part on a die of smaller radius. Since the clockwise torque is thus a variable quantity, it is necessary to vary the counterclockwise torque if the machine is to operate in a balanced-force condition where only static friction in the system need be overcome to rotate the table and wrap the part around the die.

Winding surfaces 30 and 31 on the table are designed to have radii which are substantially equal to the radii of curvature of the smallest and largest dies to be used on the machine. If a small die is used, block 73 is moved along the crossbar toward the attachment point of cable 61. This movement of the block increases the tension in cable 61 and decreases the tension in cable 62, resulting in a reduction in overall counterclockwise torque on the table. The position of the block is adjusted until the counterclockwise torque exactly counterbalances the torque imposed by the tensioned part on the table. The proper position of the block is readily determined in advance of actual stretch forming, and is normally an initial setup adjustment.

If a large diameter die is used, block 73 is moved toward the attachment point of cable 62 on the crossbar. This translation of the block along the crossbar produces an increase in tension in cable 62 and a decrease in tension in cable 61. This in turn produces an increase in the total counterclockwise torque imposed on the table because cable 62 acts on the table through a larger moment arm and therefore more than compensates for the reduction in counterclockwise torque arising from the lowered tension in cable 61.

Figure 8:
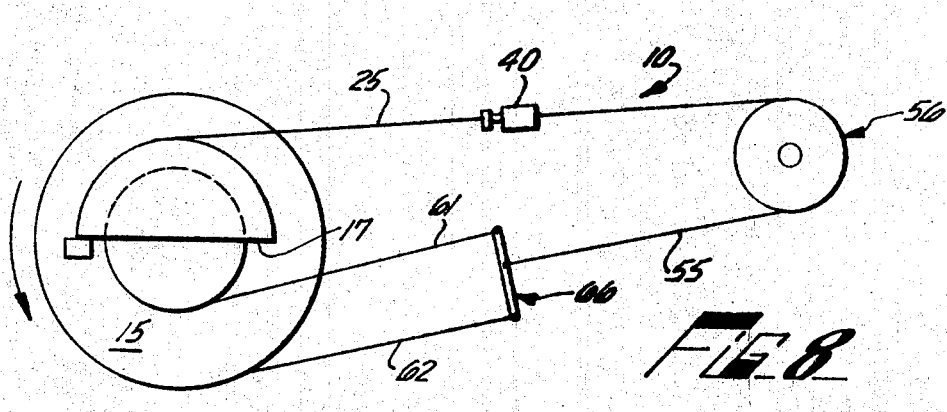
FIG. 8 is a schematic plan view showing the positioning of the machine components midway through a stretch-forming operation.
Figure 9:
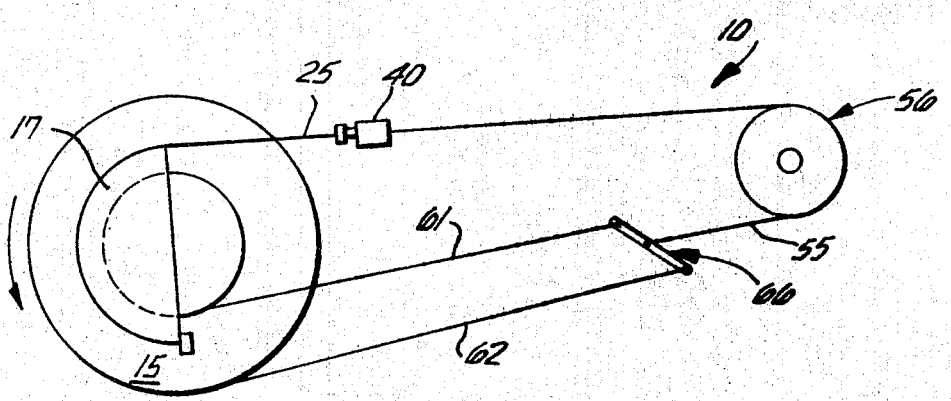
FIG. 9 is a schematic plan view showing the positioning of the machine components at the completion of a stretch-forming operation.

With the part placed in tension and block 73 positioned to establish static equilibrium in the system, drive motor 33 is energized to rotate the table counterclockwise as suggested in FIGS. 8 and 9. The part is thus wrapped around the die while under tension, and is formed to the contour of the die. Shoe 49 is driven against the part at its point of tangency with the die by hydraulic cylinder 47, and the positioning of the shoe can be varied during rotation of the table if the die forming surface is of non-circular contour.

As shown in FIGS. 7–9, crossbar 66 is pulled toward the turn-around means by main cable 55, and the crossbar also sweeps or rotates through a considerable angle during table rotation. This sweeping motion occurs because unequal lengths of the tension-distributing cables are unreeled from the winding surfaces as table rotation progresses. The tension-distributing cables are maintained taut by the crossbar throughout table rotation, and a substantially uniform counterclockwise torque is thus imposed on the table.

It is significant to note that a relatively short tensioning cylinder can be used in this machine because the cylinder and its supporting carriage travel with the part during table rotation. The requirement for a long-stroke tensioning cylinder as used in conventional machines is thus avoided, and a considerable reduction in machine cost is made possible. Similarly, a small drive motor is adequate to rotate the die-supporting table because the drive motor does not have to overcome the clockwise torque imposed by the tensioned part, and need only be of sufficient power to overcome friction in the system.

It should be noted that machine 10 can be operated without drive motor 33 if desired by adjusting the position of block 73 on crossbar 66 to produce a slight overbalancing counterclockwise torque on the table. This will produce rotation of the die-supporting table, and energy for this motion is supplied by maintaining pressurization in tension cylinder 40. Use of a drive motor 33, however, is preferred, as it provides a means for repositioning the die-supporting table after formation of the part is complete, and also because the rotation rate of the table is easily controlled by the motor.

When the part has been completely wrapped around the die surface as shown in FIG. 9, a slight additional tensioning of the part may be desirable to "set" the part against the die. This "re-stretching" operation is best accomplished by applying a slight additional tension force from both ends of the part. This is done by pressurizing hydraulic cylinder 23 such that the part is further stretched a small amount over the die.

Although the stretch-forming machine of the invention has been described in a specific presently preferred form, it is to be understood that the principles of the invention are not limited to this specific machine. For example, any flexible means such as a link chain or roller chain may be used in place of the main and secondary cables described above. Cables generally are preferred for flexible members as they are relatively inexpensive and easy to handle.

Similarly, the invention is not limited to the crossbar form of torque-varying means which provides a counterbalancing torque to the force imposed on the table by the tensioned part. For example, the crossbar can be eliminated and the main cable wrapped around a conically tapered drum on the table and coaxial with the table axis of rotation. An adjusting means is provided to move the cable vertically along the drum such that the counterbalancing torque is varied by changing the effective moment arm through which the cable tension force is exerted. The crossbar system described above, however, is preferred due to its relative simplicity and economy. This system is also well adapted to the use of servo-controls for establishing and maintaining a balanced-force condition in the machine, and a desired degree of tension in the part.

There has been described a novel rotary stretch-forming machine which is simple and economical in construction, and which is adapted for use with dies of different sizes with the machine in a balanced-force condition. The provision of substantially equal and opposite torque forces on the die-supporting table of the machine permits use of relatively small and economical components as compared to conventional stretch-forming machines.

What is claimed is:

1. A rotary stretch-forming machine, comprising:
a base;
a die-supporting table rotatably mounted on the base and adapted to receive and hold curved stretch-forming dies of differing radii of curvature;
a clamp carried by the table and adapted to grip one end of an elongated part;
tensioning means mounted on the base to be movable toward and away from the table, and adapted to grip the other end of the part and place the part under tension as the part is wrapped around the die;
torque-balancing means coupled between the tensioning means and the table for applying to the table a torque which is opposite and substantially equal to torque applied to the table by the tensioned part, the torque-balancing means being adjustable whereby balance of torque forces on the table can be achieved when the machine is used with dies of differing radii of curvature.

2. A rotary stretch-forming machine, comprising:
a base;
a die-supporting table rotatably mounted on the base and adapted to support a stretch-forming die;
a clamp carried by the table and adapted to grip one end of an elongated part to be stretch formed on the die;
turnaround means mounted on the base and laterally spaced from an axis of rotation of the table;
tensioning means positioned between the table and turnaround means to be movable toward and away from the table, the tensioning means being adapted to grip the other end of the part and being actuable to place the part under tension as the part is wrapped on the die;
coupling means passing around the turnaround means and connected at one end to the tensioning means and at another end to the table so opposing torques are applied to the table when the tensioning means is actuated to place the part and coupling means under tension, the coupling means incorporating adjustable means for varying the torque applied by the coupling means to the table for any given tension in the flexible means whereby the opposing torques are made substantially equal in magnitude when dies of differing sizes are used.

3. A rotary stretch-forming machine, comprising:
a base;
a die-supporting table rotatably mounted on the base and adapted to support a stretch-forming die, the table defining a pair of curved winding surfaces on which flexible members can be wound as the table is rotated, the surfaces having unequal radii of curvature;
a clamp carried by the table and adapted to grip one end of an elongated part;
turnaround means mounted on the base and laterally spaced from an axis of rotation of the table;
tensioning means positioned between the table and turnaround means to be movable toward and away from the table, the tensioning means being adapted to grip the other end of the part and being actuable to place the part under tension as the part is wrapped on the die;
a first flexible member passed over the turnaround means and having a first end secured to the tensioning means and a second end extending toward the table;
a pair of second flexible members having first ends secured to the table and second ends extending toward the turnaround means, one of the second flexible members passing over one of the winding surfaces and the other flexible member passing over the other winding surface whereby the second flexible members are wound on the winding surfaces at different linear rates as the table is rotated;
a crossbar disposed between the turnaround means and the table and having spaced-apart ends to which the second ends of the second flexible members are respectively secured; and
connection means for fastening the second end of the first flexible member to the crossbar at a selected position between the spaced-apart ends, whereby tension in the first flexible member is distributed between the second flexible members in an adjustable manner.

4. The machine defined in claim 3 in which the base includes an elongated beam, the beam being pivotally secured to the base to be movable about an axis spaced from and parallel to an axis of rotation of the table, and in which the tensioning means includes a carriage mounted on the beam to be movable therealong, the first end of the first flexible member being secured to the carriage.

5. The machine defined in claim 4 and further comprising power means for moving the beam about the pivot axis.

6. The machine defined in claim 4 and further comprising a second carriage mounted on the beam to be movable to selected positions therealong adjacent the die, and means on the second carriage for urging the part against the die at a point of tangency of the part and die.

7. The machine defined in claim 6 and further comprising a drive means secured to the base and coupled to the die-supporting table for rotating the table whereby the part is wrapped around the die.

8. The machine defined in claim 7 in which the clamp carried by the table includes a hydraulic cylinder for applying re-stretch force to the part after the part is wrapped around the die, and means securing the cylinder to the table whereby the clamp is adjustable in position on the table to be alignable with dies of different sizes.

9. The machine defined in claim 8 in which the first and second flexible members are cables, and in which the turnaround means comprises a pulley rotatably secured to the base.

10. The machine defined in claim 9 in which the connection means comprises a block engaged with the crossbar to be movable therealong, the first flexible member being secured to the block, and means for moving the block along the crossbar to selected positions.

References Cited

UNITED STATES PATENTS

| | | | |
|---|---|---|---|
| 757,593 | 4/1904 | Atwood | 75—151X |
| 2,411,801 | 11/1946 | Nielsen et al. | 72—151X |
| 2,412,731 | 12/1946 | Hoffman | 72—151 |
| 2,945,529 | 7/1960 | Hein | 72—183X |

MILTON S. MEHR, Primary Examiner

U.S. Cl. X.R.

72—157, 183